(12) United States Patent
Mischer et al.

(10) Patent No.: US 9,102,245 B2
(45) Date of Patent: Aug. 11, 2015

(54) SEAT TRACK END CAP AND TRAVEL STOP SEAT POSITION SENSOR

(71) Applicant: LEAR CORPORATION, Southfield, MI (US)

(72) Inventors: Hans-Peter Mischer, Bad Meinberg (DE); Klaus Walter, Paderborn (DE); Michael Wojatzki, Ennigerloh (DE); Christian Ruthmann, Rietberg (DE)

(73) Assignee: Lear Corporation, Southfield, MI (US)

( * ) Notice: Subject to any disclaimer, the term of this patent is extended or adjusted under 35 U.S.C. 154(b) by 11 days.

(21) Appl. No.: 14/156,029

(22) Filed: Jan. 15, 2014

(65) Prior Publication Data

US 2014/0291473 A1    Oct. 2, 2014

(30) Foreign Application Priority Data

Mar. 27, 2013    (DE) .......................... 10 2013 205 497

(51) Int. Cl.
*B60N 2/07*    (2006.01)
*B60N 2/02*    (2006.01)

(52) U.S. Cl.
CPC ............ *B60N 2/0727* (2013.01); *B60N 2/0725* (2013.01); *B60N 2/0722* (2013.01); *B60N 2002/0272* (2013.01)

(58) Field of Classification Search
CPC ...... B60N 2/07; B60N 2/0722; B60N 2/0727; B60N 2002/0272; B60N 2/02; B60N 2/06; B60N 2/0725
USPC ............... 248/429, 430, 424, 542; 297/344.1, 297/217.3; 280/735; 324/207.22, 207.24
See application file for complete search history.

(56) References Cited

U.S. PATENT DOCUMENTS

| | | | |
|---|---|---|---|
| 6,593,735 B2 | 7/2003 | Becker | |
| 6,820,851 B2 | 11/2004 | Mochizuki et al. | |
| 7,555,380 B2 | 6/2009 | Maue et al. | |
| 7,564,234 B2 * | 7/2009 | Endoh et al. | 324/207.24 |
| 2005/0021207 A1 | 1/2005 | Endo et al. | |
| 2010/0090083 A1 * | 4/2010 | Kojima et al. | 248/429 |
| 2011/0043010 A1 * | 2/2011 | Diemer et al. | 297/217.3 |
| 2011/0057085 A1 * | 3/2011 | Nonomiya | 248/429 |
| 2012/0073369 A1 | 3/2012 | Suzuki et al. | |
| 2013/0200243 A1 * | 8/2013 | Mischer et al. | 248/429 |

FOREIGN PATENT DOCUMENTS

| | | |
|---|---|---|
| DE | 10215073 | 9/2003 |
| EP | 2174827 A2 * | 4/2010 |

OTHER PUBLICATIONS

German Office Action for 10 2013 205 497.1 dated Jan. 16, 2014.

* cited by examiner

*Primary Examiner* — Tan Le
(74) *Attorney, Agent, or Firm* — Brooks Kushman P.C.

(57) ABSTRACT

An end cap for a seat track assembled between a vehicle seat and a floor of a vehicle. The seat track includes an upper track attached to the vehicle seat and a lower track attached to the floor that receives the upper track in a sliding relationship. A seat position sensor attached to the upper track senses the position of the lower seat track. The end cap has a plurality of longitudinally extending walls that are assembled over the lower track. One of the longitudinally extending walls is attached to a recessed portion of the lower track with an external surface that is contiguous with the outer surface of one wall of the lower track.

12 Claims, 3 Drawing Sheets

SEAT TRACK END CAP AND TRAVEL STOP SEAT POSITION SENSOR

CROSS-REFERENCE TO RELATED APPLICATIONS

This application claims foreign priority benefits under 35 U.S.C. §119(a)-(d) to DE 10 2013 205 497.1, filed Mar. 27, 2013, the disclosure of which is hereby incorporated by reference in its entirety.

TECHNICAL FIELD

This disclosure relates to vehicle seat track assemblies that are used to adjust the longitudinal position of a vehicle seat.

BACKGROUND

Vehicle seats may be attached to the floor of a vehicle with a seat track assembly that is adjustable to change the longitudinal position of the seat. Seat track assemblies may include an upper track and a lower track that are nested together and extend in the longitudinal direction. The upper seat track is attached to the seat. The lower seat track is attached to the floor. End stops may be provided by forming tabs in the upper and lower seat tracks that are bent out of the plane of the tracks to prevent the tracks from being adjusted beyond predetermined limits.

Seat position sensors may be attached to seat track assemblies to provide an electrical signal to a controller that controls inflation of an airbag. If the seat is moved to a forward location that indicates that a child or smaller person in the vehicle seat, the inflation rate of the airbag inflator may be reduced or disabled to protect the seat occupant. Seat position sensors are known that are arranged on the interior of the upper seat track to detect the position of a detection bracket on the lower seat track. Seat position sensors attached to the upper seat track add complexity and cost to the seat track assembly due to the need to provide a detection bracket on the lower seat track.

End caps are attached to the front and/or rear ends of the seat tracks to provide a finished end of the track that covers any burrs or sharp edges. Plastic end caps as shown in FIG. 2 of the drawings are assembled over the end of the lower track. The thickness of the end cap may interfere with the operation of a seat position sensor. Seat position sensors have a limited detection range and the thickness of the end cap may prevent detection of the lower track end. In addition the thickness of the end cap may interfere with moving the seat position sensor over the end cap.

This disclosure is directed to solving the above problems and other challenges as summarized below.

SUMMARY

According to one aspect of this disclosure, a seat track assembly is disclosed that is assembled between a vehicle seat and a floor of a vehicle. The seat track assembly comprises an upper track attached to the vehicle seat and a lower track attached to the floor that receives the upper track in a telescoping sliding relationship. A seat position sensor is attached to the upper track that senses the position of the end of the lower seat track. An end cap is assembled to an end of the lower track that has a recessed portion formed on the end of the lower track. A wall of the end cap is disposed between the recessed portion of the lower track and the seat position sensor. The wall is received in the recessed portion of the lower track.

The sensor may be incorporated on power or manually adjusted seats. The Sensor may be used to control airbag performance during a collision event. In one embodiment, the airbag volume may be reduced or disabled when the seat is in the front ⅓ of the adjustment range of the seat track assembly.

According to another aspect of this disclosure an end cap is disclosed for a seat track assembly that is assembled between a vehicle seat and a floor of a vehicle. The seat track assembly includes an upper track attached to the vehicle seat and a lower track attached to the floor that receives the upper track in a telescoping sliding relationship. A seat position sensor is attached to the upper track to sense the position of the end of the lower seat track. The end cap includes an end wall that extends over an end edge of the lower track and a plurality of longitudinally extending walls that are assembled over an outer surface of the lower track. One of the longitudinally extending walls is attached to a recessed portion of the lower track and has an external surface that is contiguous with the outer surface of the lower track.

According to other aspects of this disclosure that relate to the seat track assembly or the end cap, the lower track may include a reference wall and the seat position sensor may be used to sense the reference wall as the seat position sensor moves relative to the reference wall. The wall of the end cap may be attached to the recessed portion of the lower track and may have an outer surface that is flush with the reference wall.

The seat position sensor may have a detection range of X in which case the thickness of the wall of the end cap should be less than X. The detection range X, for example, may be between 1.25 and 1.75 millimeters.

The wall of the end cap may be recessed relative to a side of the lower track that faces the seat position sensor and the seat position sensor is moveable to a position wherein the seat position sensor is on the opposite side of the wall of the end cap from the recessed portion of the lower track. The sensor is oriented to allow the sensor to be moved over the end cap. The greater the distance between the rail and the sensor, the smaller the tolerance is for the detection range. Sensor positioning tolerances can be more easily accommodated when there is a small gap between the rail and the sensor.

The end cap may include a first engagement feature and the lower track may include a second engagement feature. The end cap may be assembled to the lower track with first engagement feature being attached to the second engagement feature. Alternatively, the end cap may include a tang and the lower track may include an opening. The tang may be received in the opening to secure the end cap to the opening.

These and other aspects of this disclosure will be described in more detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
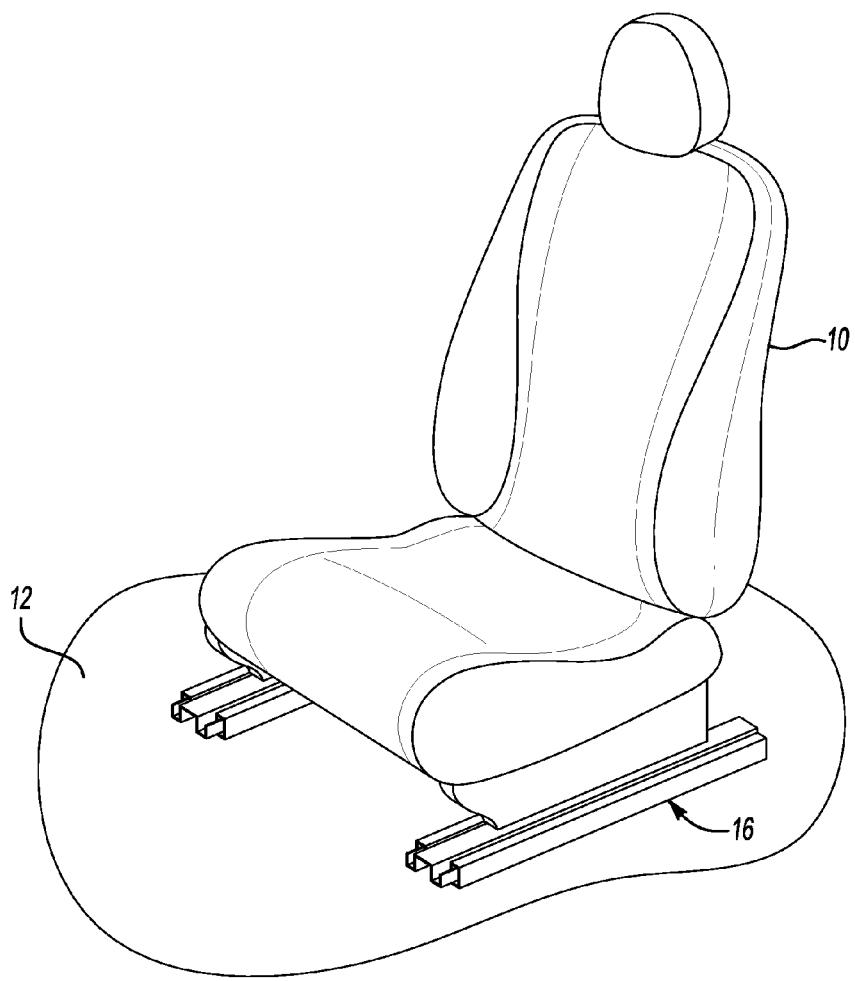
FIG. 1 is a perspective view of a vehicle seat attached to the floor of a vehicle by a seat track assembly.

Referring to FIG. 1, a vehicle seat 10 is shown attached to a vehicle floor, or floor pan, 12. The seat 10 is attached to the floor 12 by a seat track assembly 16.

Figure 2:
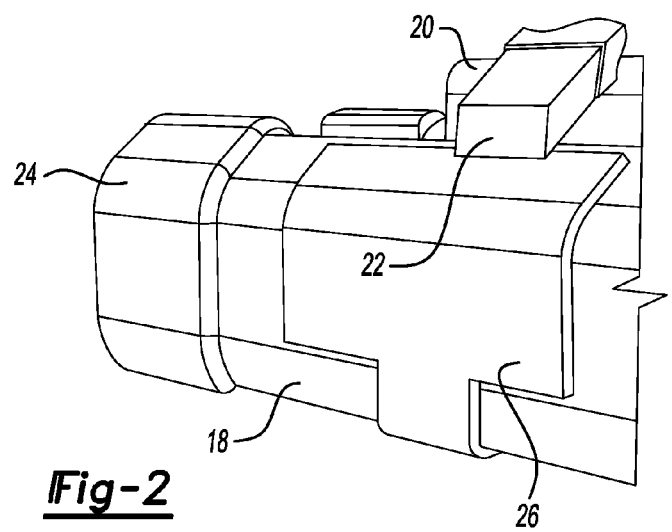
FIG. 2 is a fragmentary perspective view of on end of a prior art seat track assembly.

Referring to FIG. 2, a prior art seat track assembly 16 is illustrated that includes a lower track 18 and an upper track 20. An end cap 24 is attached to one end of the lower track 18. The one end of the lower track 18 may be the front or rear end of the lower seat track 18. A bracket 26 is fixed to the lower track 18. A sensor 22 is attached to the upper track 20 to sense the location of the bracket 26. The end cap 24 extends outboard from the lower track 18 to approximately the same extent relative to the lower track 18.

Figure 3:
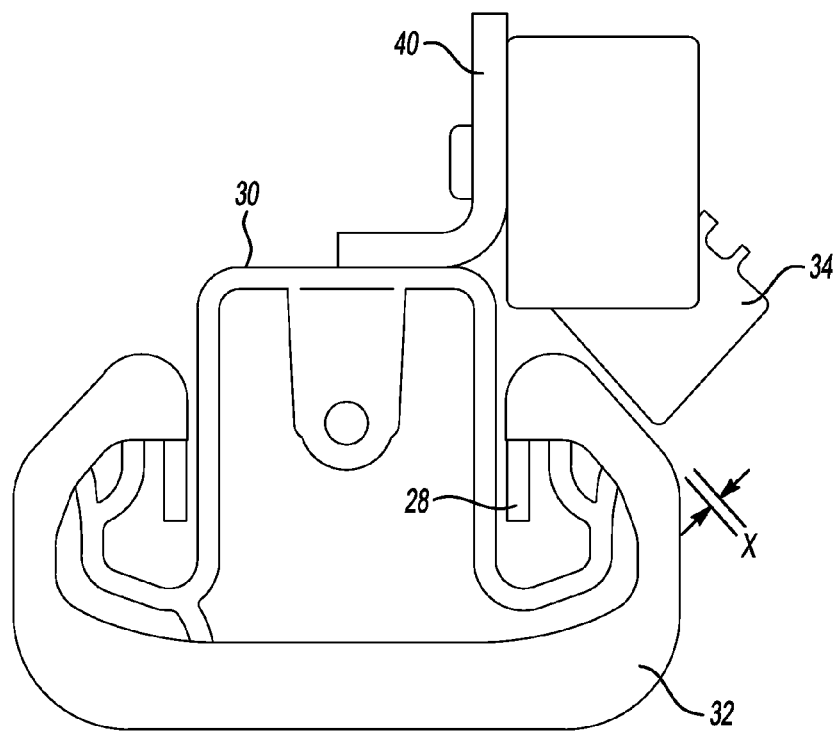
FIG. 3 is an end elevation view of a seat track assembly including a seat position sensor.
Figure 4:
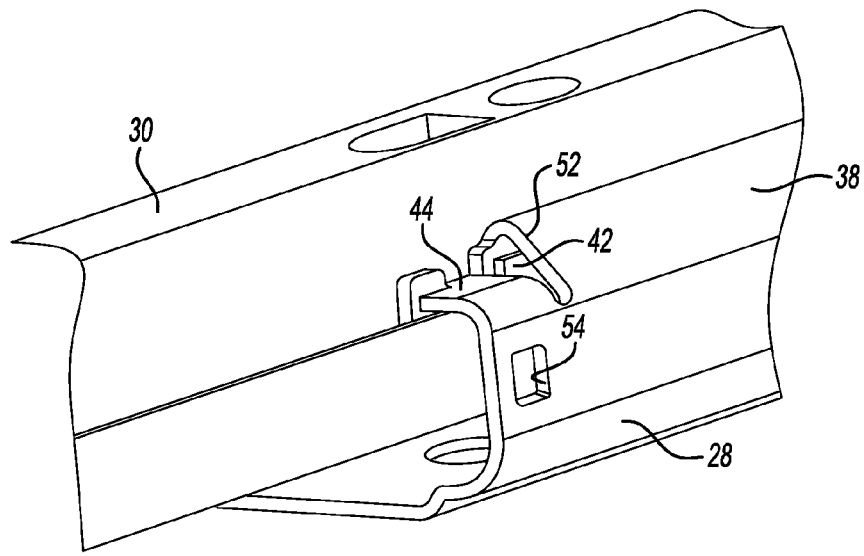
FIG. 4 is a fragmentary perspective view of an end stop for a seat track assembly.

Referring to FIGS. 3 and 4, a lower track 28 and upper track 30 are shown assembled together in accordance with the illustrated embodiment of this disclosure. An end cap 32 made according to this disclosure is assembled over one end of the lower track 28. A seat position sensor 34 is held in a spaced relationship relative to the lower track 28 and the end cap 32. The detection range of the sensor 34 is illustrated, as an example by "X" in FIG. 3. The sensor 34 is attached to the upper track 30 by a sensor bracket 40.

Referring to FIG. 4, the lower track 30 is illustrated without the end cap 32. A reference wall 38 is the wall of the lower track 28 that is sensed by the sensor 34 as the tracks 28 and 30 move relative to each other. An end stop tab 42 is provided on the upper track 30 that stops movement of the upper track when the tab contacts a recessed portion 44 of the lower track 28.

Figure 5:
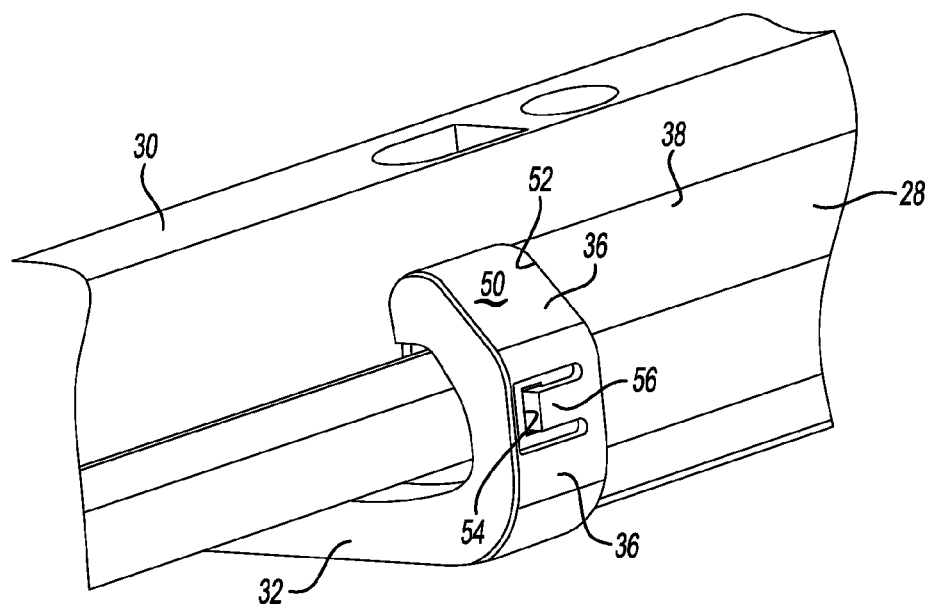
FIG. 5 is a fragmentary perspective view of an end stop for a seat track assembly showing the end cap attached by a set of engagement features.
Figure 6:
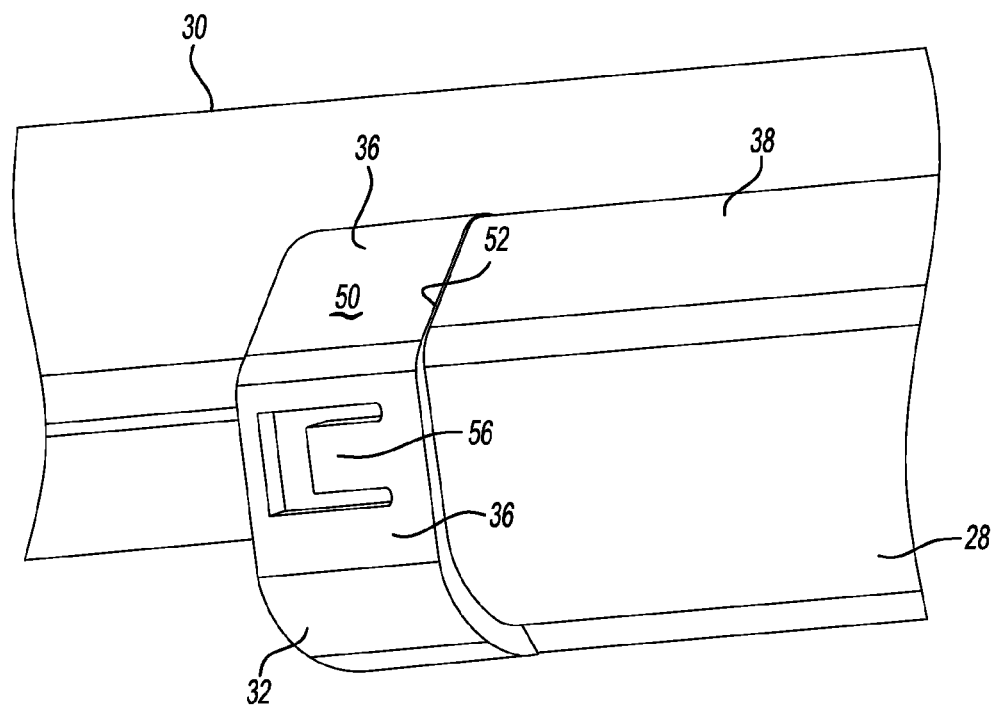
FIG. 6 is a fragmentary perspective view of an end stop for a seat track assembly showing the end cap attached by a set of engagement features with the reduced wall height wall received in the recessed portion of the lower track.

Referring to FIGS. 4 through 6, the end cap 32 is attached to the lower track 28 with an outer surface 50 of the end cap 32 being of reduced height as compared to the prior art end cap 24 shown in FIG. 2. The end cap 34 has a plurality of longitudinally extending walls 36 that are assembled over one end of the lower track 28.

As shown in the embodiment of FIG. 6, the outer surface 50 of one of the longitudinally extending walls 36 is flush with the reference wall 38 of the lower track 28. As used herein the term "flush" means substantially at the same level as the reference wall 38 so that there is no interference with the sensor 34 if the sensor were to be moved over the end cap 32. The small gap between the sensor 34 and the reference wall 38 allows for the use of a sensor with a greater tolerance range to overcome sensor positioning tolerances. The end cap 34 is butted up against an abutting edge of the reference wall 38 of the lower track 28.

The end cap 34 is retained on the lower track 28 by first and second engagement features 54 and 56. The first engagement feature 54, as illustrated, is an opening in the lower track 28. The second engagement feature 56, as illustrated, is a tang that is integrally formed on the end cap 34. The tang 56 is received into the opening when the end cap is properly secured to the end of the lower track 28.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A seat track assembly that is assembled between a vehicle seat and a floor of a vehicle, the seat track assembly comprising:
    an upper track attached to the vehicle seat;
    a lower track attached to the floor that receives the upper track in a telescoping sliding relationship;
    a seat position sensor attached to one of the upper track and the lower track that senses the position of the other of the upper track and the lower track; and
    an end cap assembled to an end of one of the tracks, the one track having a recessed portion formed on the end of the one track, wherein a wall of the end cap between the recessed portion of the one track and the seat position sensor is received in the recessed portion of the one track, and wherein the lower track includes a reference wall that is sensed by the seat position sensor, the reference wall extends outboard from the recessed portion, and wherein the seat position sensor senses the reference wall as the seat position sensor moves relative to the reference wall and senses the recessed portion through the wall of the end cap located between the recessed portion of the lower track and the seat position sensor.

2. The seat track assembly of claim 1 wherein the wall of the end cap is attached to the recessed portion of the lower track and has an outer surface that is flush with the reference wall.

3. The seat track assembly of claim 1 wherein the seat position sensor has a detection range of X and the thickness of the wall of the end cap is less than X.

4. The seat track assembly of claim 3 wherein the detection range X is between 1.25 and 1.75 millimeters.

5. A seat track assembly that is assembled between a vehicle seat and a floor of a vehicle, the seat track assembly comprising:
    an upper track attached to the vehicle seat;
    a lower track attached to the floor that receives the upper track in a telescoping sliding relationship;
    a seat position sensor attached to one of the upper track and the lower track that senses the position of the other of the upper track and the lower track; and
    an end cap assembled to an end of one of the tracks, the one track having a recessed portion formed on the end of the one track, wherein a wall of the end cap between the recessed portion of the one track and the seat position sensor is received in the recessed portion of the one track, wherein the wall of the end cap is recessed relative to a side of the lower track that faces the seat position sensor and the seat position sensor is moveable to a position wherein the seat position sensor is on the opposite side of the wall of the end cap from the recessed portion of the lower track.

6. The seat track assembly of claim 1 wherein the end cap includes a first engagement feature and the lower track includes a second engagement feature, wherein the end cap is assembled to the lower track with the first engagement feature being attached to the second engagement feature.

7. The seat track assembly of claim 1 wherein the end cap includes a tang, the lower track includes an opening, and wherein the tang is received in the opening to secure the end cap to the opening.

8. In combination, an end cap for a seat track assembly that is assembled between a vehicle seat and a floor of a vehicle, the seat track assembly including an upper track attached to the vehicle seat, a lower track attached to the floor that receives the upper track in a telescoping sliding relationship, and a seat position sensor attached to one of the upper track and the lower track that senses the position of the other of the upper track and the lower seat track, the end cap comprising:

an end wall that extends over an end edge of one of the tracks;

a plurality of longitudinally extending walls that are assembled over the one track, and wherein the end cap includes a first engagement feature and the lower track includes a second engagement feature, wherein the end cap is assembled to the one track with the first engagement feature being attached to the second engagement feature, wherein the lower track includes a reference wall, and wherein the seat position sensor senses the reference wall as the seat position sensor moves relative to the reference wall, and the one of the longitudinally extending walls of the end cap is longitudinally aligned with the reference wall, and wherein the one of the longitudinally extending walls of the end cap is attached to a recessed portion of the lower track and the external surface is flush with the reference wall.

9. The combination of claim 8 wherein the seat position sensor has a detection range of X and the thickness of the one of the longitudinally extending walls of the end cap is less than X.

10. The combination of claim 9 wherein the detection range X is between 1.25 and 1.75 millimeters.

11. In combination, an end cap for a seat track assembly that is assembled between a vehicle seat and a floor of a vehicle, the seat track assembly including an upper track attached to the vehicle seat, a lower track attached to the floor that receives the upper track in a telescoping sliding relationship, and a seat position sensor attached to one of the upper track and the lower track that senses the position of the other of the upper track and the lower seat track, the end cap comprising:

an end wall that extends over an end edge of one of the tracks;

a plurality of longitudinally extending walls that are assembled over the one track, and wherein the end cap includes a first engagement feature and the lower track includes a second engagement feature, wherein the end cap is assembled to the one track with the first engagement feature being attached to the second engagement feature, and wherein the one of the longitudinally extending walls of the end cap is recessed relative to a side of the lower track that faces the seat position sensor and the seat position sensor is moveable to a position wherein the seat position sensor is on the opposite side of the longitudinally extending wall of the end cap from a recessed portion of the lower track.

12. The combination of claim 8 wherein includes a tang, the lower track includes an opening, and wherein the tang is received in the opening to secure the end cap to the opening.

* * * * *